US008341646B2

(12) United States Patent
Bornhoevd et al.

(10) Patent No.: US 8,341,646 B2
(45) Date of Patent: Dec. 25, 2012

(54) INFORMATION SYSTEM WITH EVENT-ENABLED DATA OBJECTS

(75) Inventors: Christof Bornhoevd, Belmont, CA (US); Sumeet Bajaj, Pune MH (IN)

(73) Assignee: SAP AG, Walldorf (DE)

(*) Notice: Subject to any disclaimer, the term of this patent is extended or adjusted under 35 U.S.C. 154(b) by 1274 days.

(21) Appl. No.: 11/627,789

(22) Filed: Jan. 26, 2007

(65) Prior Publication Data

US 2008/0184266 A1 Jul. 31, 2008

(51) Int. Cl.
  G06F 3/00 (2006.01)
  G06F 9/44 (2006.01)
  G06F 9/46 (2006.01)
  G06F 13/00 (2006.01)
(52) U.S. Cl. ........................................ 719/318
(58) Field of Classification Search ............ 719/318
  See application file for complete search history.

(56) References Cited

U.S. PATENT DOCUMENTS

| | | | |
|---|---|---|---|
| 5,765,160 A * | 6/1998 | Yamaguchi ............................ 1/1 |
| 5,913,061 A * | 6/1999 | Gupta et al. ................... 719/310 |
| 6,324,587 B1 * | 11/2001 | Trenbeath et al. ............. 719/310 |
| 6,438,618 B1 * | 8/2002 | Lortz et al. ..................... 719/318 |
| 6,779,184 B1 * | 8/2004 | Puri et al. ....................... 719/315 |
| 6,868,544 B2 | 3/2005 | Dalal et al. |
| 6,922,721 B1 | 7/2005 | Minborg et al. |
| 6,941,560 B1 | 9/2005 | Lowry et al. |
| 6,999,977 B1 * | 2/2006 | Norcott et al. ......................... 1/1 |
| 2006/0179342 A1 * | 8/2006 | Reed et al. ......................... 714/4 |
| 2007/0288244 A1 * | 12/2007 | Bethea et al. ..................... 705/1 |

FOREIGN PATENT DOCUMENTS

EP 1 130 845 9/2001

OTHER PUBLICATIONS

'A Technical Tour of IBM Web Sphere Information Integrator Content Edition' [online]. Johnson, 2005, [retrieved on Jan. 25, 2007]. Retrieved from the Internet: <URL: www-128.ibm.com/developerworks/cn/db2/library/techarticles/dm-0502johnson/dm-0502johnson.pdf>, 25 pages.
'Business Object Facility' [online]. Digre, 1996, [retrieved on Jan. 25, 2007]. Retrieved from the Internet: <URL: www.jeffsutherland.com/oopsla96/digre96.pdf>, 82 pages.
'IBM Websphere BPM Suite' [online]. Bruce Silver Associates, 2005, [retrieved on Jan. 25, 2007]. Retrieved from the Internet: <URL: www.eecg.toronto.edu/~jacobsen/courses/ece1770/reader06/bmp-report.pdf>, 28 pages.
Gore et al., "Designing and Optimizing a Scalable CORBA Notification Service," *ACM SIGPLAN Notices*, 2001, 36(8): 196-204.

(Continued)

*Primary Examiner* — Andy Ho
*Assistant Examiner* — Timothy A Mudrick
(74) *Attorney, Agent, or Firm* — Fish & Richardson P.C.

(57) ABSTRACT

A computer-implemented information system involves data objects stored in the database with characteristics of such data objects defined at a design time. The system is able to associate customized data object events with at least some of the data objects subsequent to the design time to define subscriber objects. Data objects which are publisher objects are determined based on the events. In one implementation, the information system includes a messaging manager, with a message broker and an event controller associated therewith.

20 Claims, 7 Drawing Sheets

OTHER PUBLICATIONS

"Mapping Enterprise Events to the CORBA Notification Service," *Proceedings of the Fourth International Enterprise Distributed Object Computing Conference*, Makuhari, Japan, 2000, pp. 124-134.

"Cooperation of Heterogeneous Legacy Information Systems: a Methodological Framework," *Proceedings of the Fourth International Enterprise Distributed Object Computing Conference*, Makuhari, Japan, 2000, pp. 216-225.

"A Reference Infrastructure for Electronic Commerce," *Proceedings of The First Asia-Pacific Conference on Quality Software (APAQS'00)*, China, 2000, pp. 324-333.

Matching Events in a Content-based Subscription System, *Proceedings of the eighteenth annual ACM symposium on Principles of distributed computing*, 1999, Atlanta, Georgia, pp. 56-61.

Communication pursuant to Article 94(3) EPC dated Jul. 16, 2012 in EP Application No. 07024167.4 (7 pages).

Vargas et al., "Integrating Databases with Publish/Subscribe," International Conference on Distributed Computing Systems, 2005, 25th IEEE, Columbus, OH Jun. 6-10, 2005, Piscataway, NJ, IEEE, Jun. 6, 2005 (pp. 392-397; XP010808082, DOI: 10.1109/ICSCSW.2005.70 ISBN: 978-0-7695-2328-6.

Koschel et al., "Configurable event triggered services for CORBA-based systems," 2nd International Enterprise Distributed Object Computing Workshop, 1998. EDOC '98., La Jolla, CA, Nov. 3-5, 1998; New York, NY, IEEE, US, Nov. 3, 1998 (pp. 306-318); XP010309740, DOI: 10.1109/EDOC.1998.723266.

* cited by examiner

INFORMATION SYSTEM WITH EVENT-ENABLED DATA OBJECTS

TECHNICAL FIELD

This document relates to information systems and data objects of such systems.

BACKGROUND

Enterprise business applications often make use of business objects to represent entities or concepts in a particular business application. Business objects may be associated with classes, which define the structure and (at least to some degree) intended meaning (i.e., business semantics) of a homogenous set of real-world entities. Business object classes can be related to other classes via associations, which generally state a semantic dependency. One example of such semantic dependency would be the relationship between a customer and its purchase orders. As such, business object instances may represent individual business entities that are manipulated by business processes.

Business object classes, as well as certain changes in the state of business objects, may be defined at the design time associated with the class of business objects or the design time of other system parameters. It is not always practical, efficient, or desirable for classes, event types, changes in state, or other characteristics of business objects to be defined at design times.

SUMMARY

In one implementation, a computer-implemented information system makes use of data objects stored in a database. The data objects have one or more characteristics which are defined at a design time. The system includes suitable hardware and associated programming to associate customized data object events with at least some of the data objects subsequent to the design time, thereby defining subscriber objects. The system communicates control events based on the customized data object events. The system is able to determine which of the data objects are publisher objects based on the control events. The system is also able to add new data objects, as well as communicate already existing, customized data object events to such new data objects.

In one variation, the system includes suitable programming so that at least one predicate associated with a control event may be determined for one or more associated publisher objects. If the predicate is true, a notification message is published as a result.

In another variation, the system includes a messaging manager for the subscriber objects and the publisher objects. The messaging manager is able to maintain a subscription list which includes data corresponding to event types, customized data object events, and a reference count. The messaging manager is able to alter the value of the reference count for a given one of the data object events in response to a change in the number of subscriber objects associated with the given data object event.

In yet another implementation, the information system includes a business application platform, in which the data objects comprise business objects and the data object events comprise business events. In one variation, an application programming interface for accessing the data objects is part of the system, and the messaging manager comprises a message broker and an event controller.

A computer-implemented method associates business objects in a database of an enterprise system application with events. The method involves defining business objects at design time; receiving a request subsequent to the design time for one of the business objects to subscribe to an event, thereby defining a subscriber object; determining which of the business objects are related to the event, thereby defining publisher objects; and generating a notification message when the event is detected.

In one variation of the method, predicates of the event are communicated to the publisher objects and a determination is made of whether the predicates are true, upon which a notification message is generated.

The details of one or more implementations are set forth in the accompanying drawings and the description below. Other features, objects, and advantages related to the implementations will be apparent from the description and drawings, and from the claims.

DESCRIPTION OF DRAWINGS

Like reference symbols in the various drawings indicate like elements.

DETAILED DESCRIPTION

Figure 1:
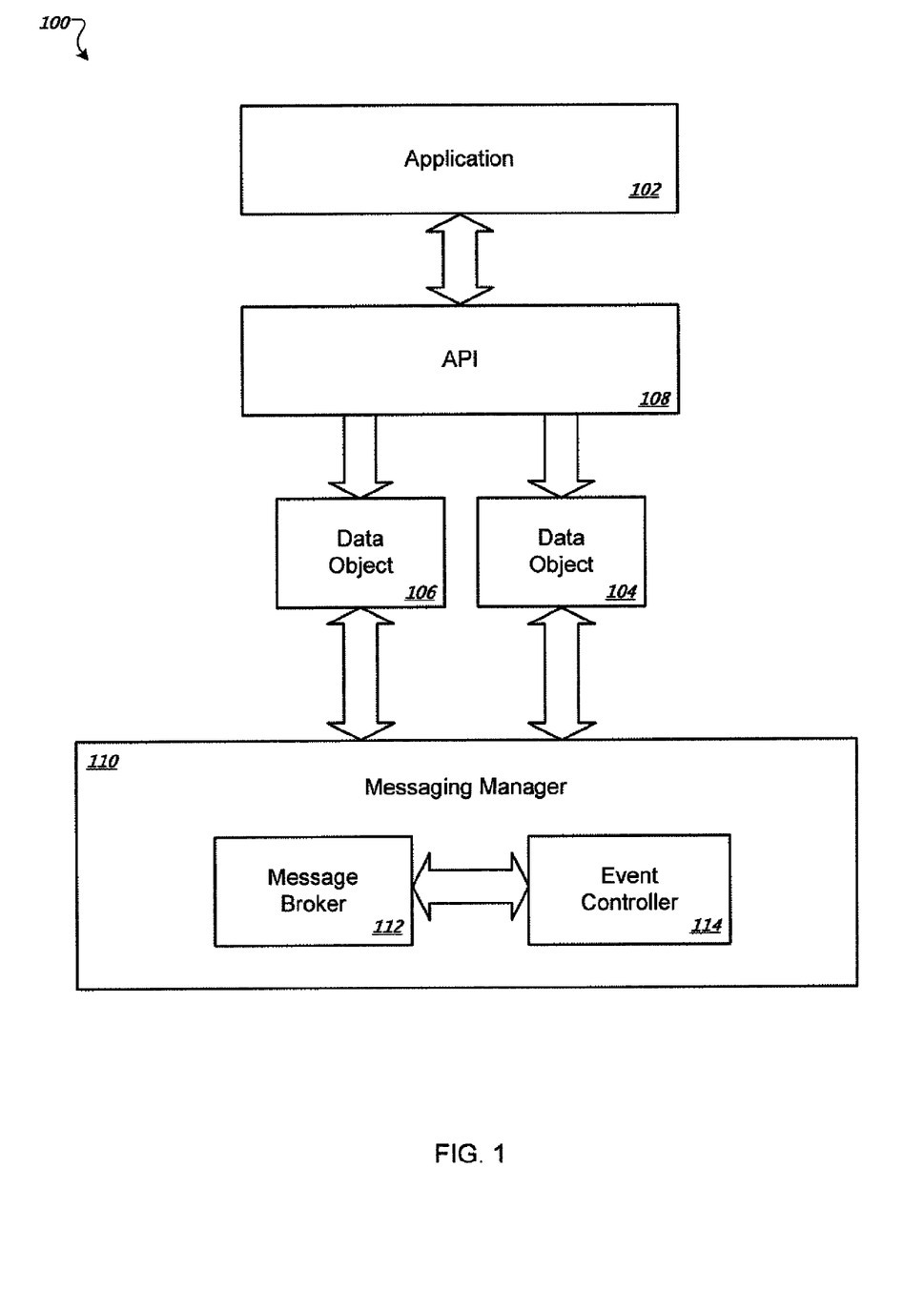
FIG. 1 is a schematic diagram of an information system that uses event-enabled data objects.

FIG. 1 is a schematic diagram of an information system 100 that uses event-enabled data objects. A computer application 102 can interact with data objects, such as data objects 104 and 106, through an Application Programming Interface (API) 108. The application 102 can be in any number of fields, such as business applications. The API 108 can make data object services available to the application 102.

Data objects 104 and 106 can represent entities or concepts in any number of applications, such as a particular business application. Accordingly, system 100 can include multiple data objects, and data objects can be categorized or characterized by type. For example, the data object 104 can represent a customer and" the data object 106 can represent a sales order. Data objects can be grouped into categories, or classes, based on the concept they represent. For example, all sales order data objects can be grouped into a sales order class, and all customer data objects can be grouped into a customer class.

A particular data object can be referred to as an instance of a particular class. For example, a particular sales order data object can be referred to as an instance of a sales order class. Data objects can have design-time characteristics, such as an identification of a set of data fields that can store the data of the object. Data objects can also have associated run-time characteristics, such as specific values for data fields at a particular point in time. New data object instances can be added to the system during the execution of the application 102. For example, a new customer data object can be created.

A data object, such as data object 104, can be interested in a state change of another data object, such as data object 106. For example, if an address of a customer data object changes, a sales order data object representing a sales order for that customer can be notified so that a shipping address in the sales order data object can be updated.

A state change of a data object can be an example of a data object event. A data object event is the occurrence of a specific condition which another data object or service that uses data objects is interested in. Data object event conditions can be identified during or subsequent to design time. A data object event that is identified during design time can be referred to as a predefined data object event. For example, the creation, update or deletion of a data object can be predefined data object events.

Data object events that are configured subsequent to design time can be referred to as customized data object events. The condition of a customized data object event can be identified and configured during the execution of an application. Conditions for customized data object events do not need to be known at design time. A customized data object event can be defined in part by referencing a predefined data object event. For example, a customized data object event can be defined with a condition of "a sales order is created with an exempt tax code".

Customized data object events can be associated with a particular data object instance, or with an entire class of objects. A customized data object event with an event condition configured as "the quantity of a sales order becomes greater than 7500" may be associated with the entire class of sales order data objects. A customized data object event can refer to a single instance, such as an event associated with the changing of a particular customer data object's address.

A data object can subscribe to a data object event in order to become notified when the data object event occurs. If a data object is no longer interested in a data object event it can unsubscribe. A data object that triggers a data object event can publish a notification message to data objects that have subscribed to the data object event. For example, a change of state of a business object, such as the changing of a field value, can result in the publishing of data object event notification messages. A data object can simultaneously be both a subscriber and a publisher data object.

A messaging manager 110 can provide functionality for message subscribing and publishing. The messaging manager 110 can include a message broker 112 and an event controller 114. Message broker 112 and event controller 114 are implemented by suitable software, hardware, or both. In one implementation, message broker 112 and event controller 114 include substantially independent program modules running on associated hardware. The message broker 112 can provide services that allow for the communication of messages to data objects and other entities, such as the event controller 114. The message broker 112 can use a messaging architecture that supports publishing and subscribing, such as the Java Message Service (JMS), available from Sun Microsystems, Inc. An example messaging service that supports JMS is ActiveMQ, available from the Apache Software Foundation.

The event controller 114 can control event-based behavior of business objects and can keep track of publishers and subscribers for each data object event type. Data objects can communicate with the event controller 114 through the use of control events. The event controller 114 can send a control event to newly-created data object instances to inform them about data object events they should publish. The event controller 114 can send a control event to publisher data objects to notify them that a new data object event type has been subscribed to. The event controller 114 can send a control event to publisher data objects to notify them when there are no longer any subscribers to a data object event, allowing data objects to avoid needlessly publishing data object event notifications.

In this implementation, data objects, such as the data object 104, are stored in a database which handles database transactions. Database transactions can include any of the wide variety of changes to data objects that are either committed to the database or rolled back as a group. The message broker 112 can handle event notification transactions. To ensure that changes made to data objects have been committed before event notifications related to those changes are sent, event notification messages can be sent after corresponding database transactions have been committed.

Figure 2:
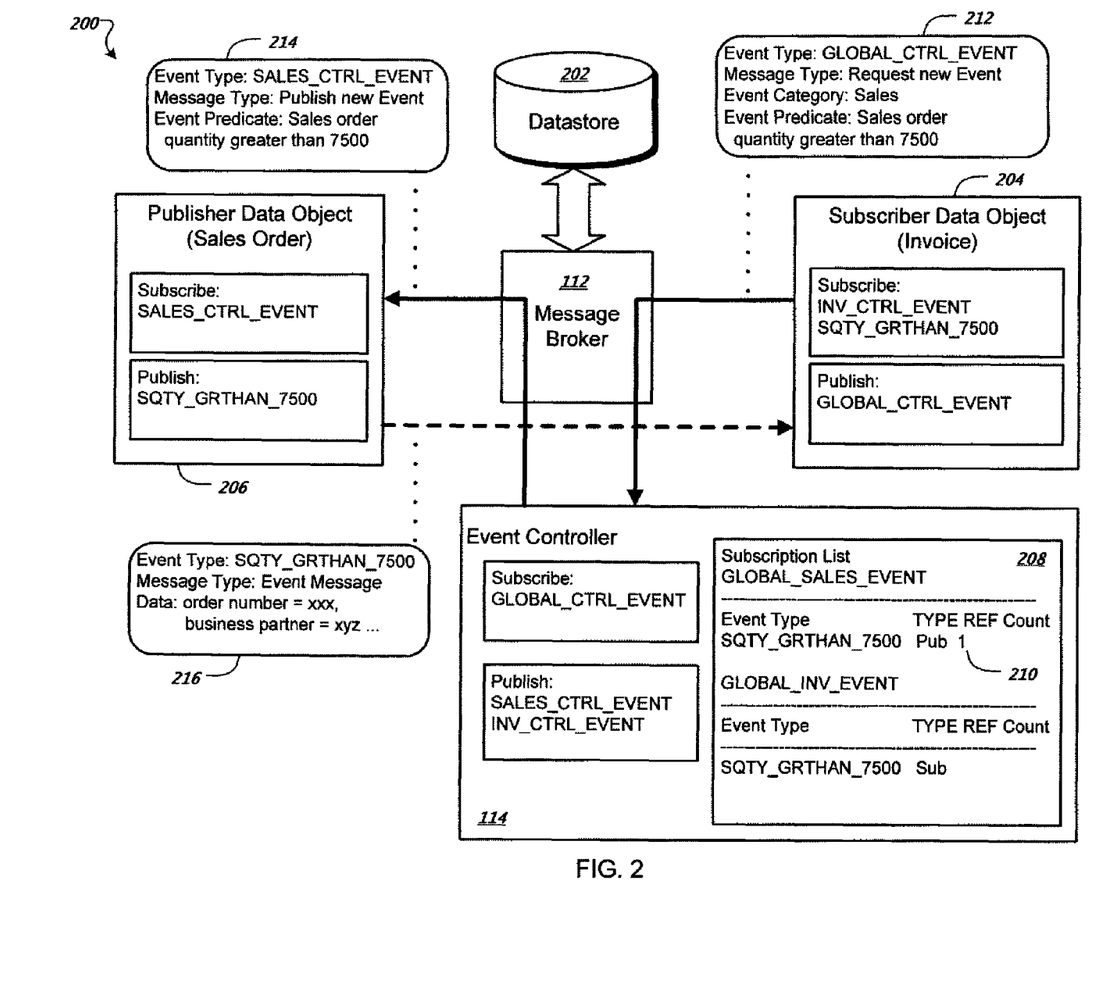
FIG. 2 is a schematic diagram illustrating message communication related to a new data object event type subscription.

FIG. 2 is a schematic diagram of an information system 200, such as may be used by a business or other enterprise, and illustrating message communication related to a new data object event type subscription. The message broker 112 can control the routing of all messages and can log all messages to a persistent data store 202. The event controller 114 can communicate with an invoice data object 204 and a sales order data object 206. The invoice data object 204, sales order data object 206, and event controller 114 can keep track of the events that they publish and subscribe to. The event controller 114 can maintain a subscription list 208, which can include entries for each data object type. The subscription list 208 can include, for each data object type, a list of events associated with that data object type, the role (publish or subscribe) that data objects of that type have, and a reference count 210.

By way of example, the invoice data object 204 is interested in an event condition related to sales order data objects. The invoice data object 204 wants to be notified when a quantity on any sales order data object instance becomes greater than 7500. The invoice data object 204 can request a subscription to this new event type by communicating a control event to the event controller 114. The event controller 114 can subscribe to a global control event type in order to be able to receive messages from data objects such as the invoice data object 204. For example, the event controller 114 can subscribe to a global control event type represented by a GLOBAL_CTRL_EVENT identifier. The event controller 114 can be the sole subscriber to the GLOBAL_CTRL_EVENT event type so that it is the only recipient of messages of this type. The invoice data object 204 can send a message 212 that includes a global control event type represented by the GLOBAL_CTRL_EVENT identifier.

The message 212 can include a message type field, with a value that indicates that the message is a subscription request. An event category field can be included in the message 212 to indicate that the event is applicable to sales order data objects, since any sales order data object instance can potentially publish the event. The message 212 can include an event predicate field which can describe the event condition (e.g., a sales order quantity greater than 7500).

When the event controller 114 receives the message 212 it can determine from an event category field that the message 212 is a subscription request. The event type of the requested event can be represented by an identifier such as SQTY_GRTHAN_7500. The event controller 114 can check to see if there are already existing subscriptions for the requested event type by checking the reference count 210 in the subscription list 208 that is associated with the requested event type. If the reference count 210 is non-zero, then publishers are already publishing messages for this event type. The event controller 114 can increment the reference count 210 to indicate that another subscription to this event type has occurred. If the reference count 210 is zero then the event controller can notify publishers to begin publishing events for the new event type.

Sales order data objects can be potential publishers for the new event type so the event controller can send a message to all sales order data objects to inform them to begin monitoring the new event. In order to be able to receive messages from the event controller, sales order data objects can subscribe to a global control event type associated with the sales order class. This global control event type can be represented by the identifier SALES_CTRL_EVENT. The event controller 114 can send a message 214 with an event type of SALES_CTRL_EVENT to all sales order data object instances.

The sales order data object 206 can receive the message 214. A message type field can indicate that the message 214 is a request to publish a new event. The message 214 can include an event predicate field which can describe the event condition (e.g., a sales order quantity greater than 7500). The sales order data object 206 can maintain an event type list which can include a list of event types it can publish, along with the predicates for these event types. The sales order data object 206 can store the predicate included in the message 214 in this event type list.

When the sales order data object 206 is changed, it can traverse its event type list and evaluate each event predicate. If an event predicate evaluates to true, an event message can be published. For example, if the quantity of the sales order data object 206 becomes greater than 7500, the event predicate from the message 214 can be evaluated to true and an event notification message can be sent to subscribers of that event. A message 216 with an event type of SQTY_GRTHAN_7500 can be sent. A message type field can indicate that the message is associated with a data object event. The message can include information related to the sales order, such as the value of order number and business partner fields.

The invoice data object 204 can receive the message 216 because it has subscribed to the event type associated with the identifier SQTY_GRTHAN_7500. Any other data objects that have subscribed to the SQTY_GRTHAN_7500 event can receive the message 216 as well.

Figure 3:
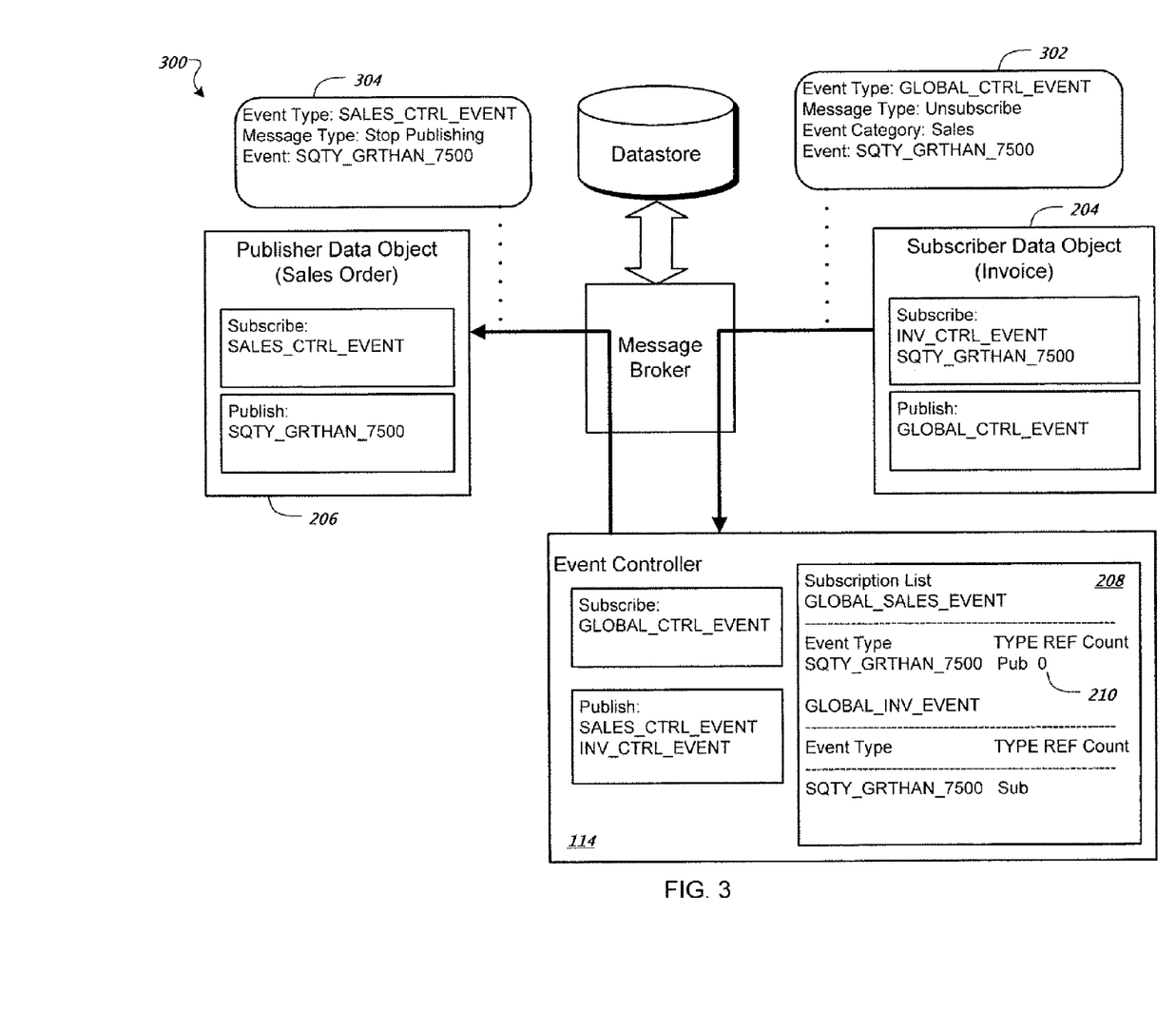
FIG. 3 is a schematic diagram illustrating message communication related to an exemplary unsubscribe request.

FIG. 3 is a schematic diagram 300 illustrating message communication related to an exemplary unsubscribe request. In this example, the invoice data object 204 wants to unsubscribe from the event type represented by the SQTY_GRTHAN_7500 identifier. The invoice data object 204 can send a control message 302 to the event controller 114. The control message 302 can indicate that the message type is an unsubscribe request for the event type SQTY_GRTHAN_7500.

The event controller 114 can decrement the reference count 210 of the SQTY_GRTHAN_7500 event type in the subscription list 208. If the reference count 210 becomes zero after decrementing this can indicate that there are no longer any subscriptions to the SQTY_GRTHAN_7500 event type. The event controller 114 can delete the entry associated with the SQTY_GRTHAN_7500 event type from the subscription list 208.

The event controller 114 can notify all sales order data objects to stop publishing events associated with the SQTY_GRTHAN_7500 event type. The event controller 114 can send a control message 304 that can be received by the sales order data object 206. A message type field included in the message 304 can indicate that the message 304 is a request to stop publishing an event. An event field included in the message 304 can indicate that the SQTY_GRTHAN_7500 event should no longer be published. After receiving the control message 304, the sales order data object 206 can delete the event associated with the SQTY_GRTHAN_7500 event type from its event list so that events of this type are no longer published.

Figure 4:
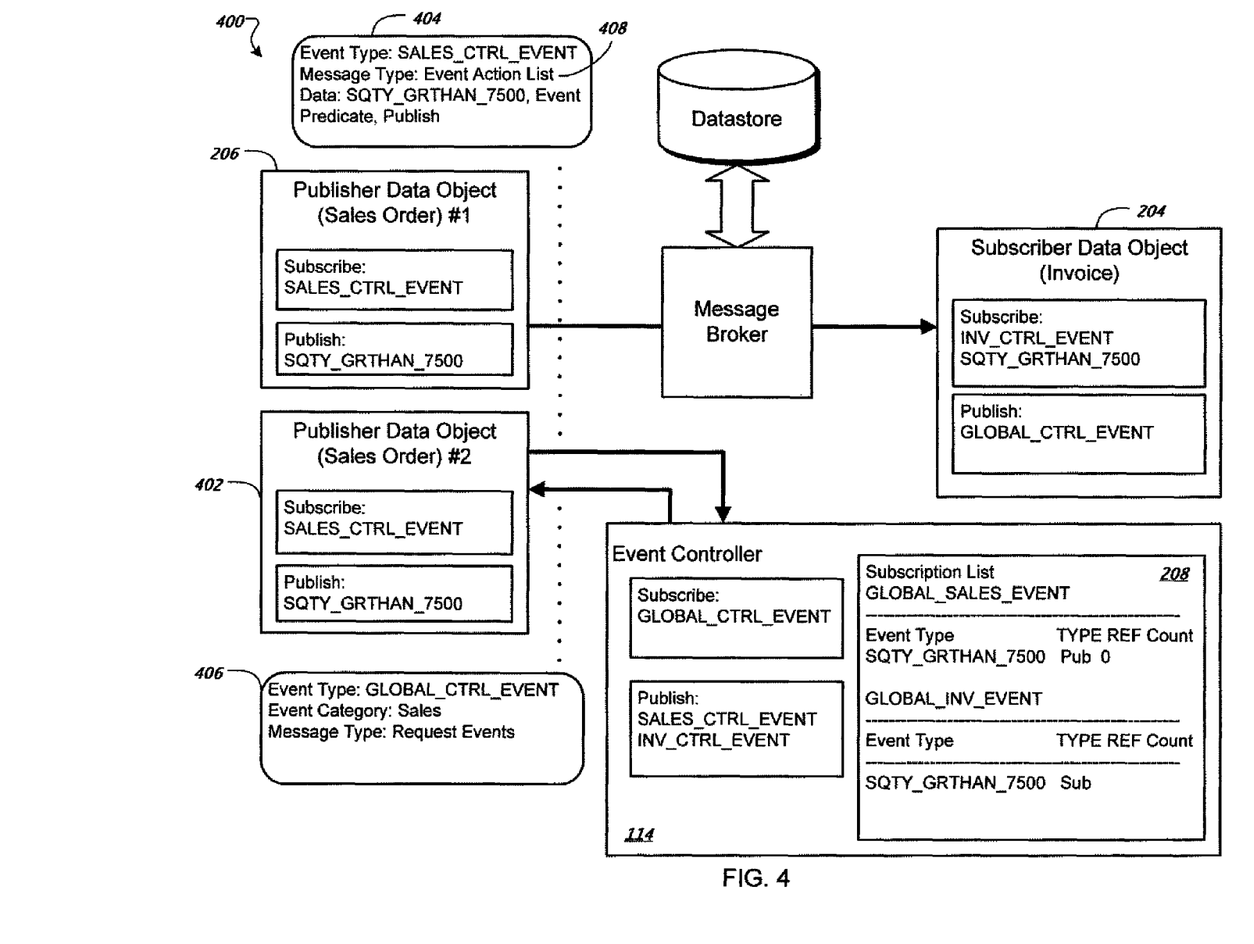
FIG. 4 is a schematic diagram illustrating the handling of new data object instances.

FIG. 4 is a schematic diagram 400 illustrating the handling of new data object instances. The invoice data object 204 is subscribed to a SQTY_GRTHAN_7500 event type. The sales order data object 206 is configured to publish SQTY_GRTHAN_7500 events. If a new sales order instance is created, such as a sales order data object 402, the new instance can be configured to also publish the SQTY_GRTHAN_7500 event.

When the sales order data object 402 is created it can send a control message 404 to the event controller 114, asking to be informed about publish and subscribe actions that are applicable to sales order data objects. The subscription list 208 can include a type field which can indicate whether data objects for an event type should publish or subscribe to that particular event type. The event controller 114 can generate an event action list that can include publish and subscribe actions that are relevant to a particular data object type, such as the sales order data object type.

The event controller 114 can send a control message 406 to the new sales order data object 402. The control message 406 can include an event action list 408 generated by the event controller 114. The event action list 408 can include a list of event types that the new sales order data object 402 should participate in, and can include predicates for those event types and indicators specifying whether the sales order data object 402 should subscribe to or publish those event types. For example, the event action list 408 can include the SQTY_GRTHAN_7500 event type with a role type of "publish". The new sales order data object 402 can register the predicate, evaluate the predicate when the object changes, and send an event notification message if the predicate evaluates to true.

Figure 5:
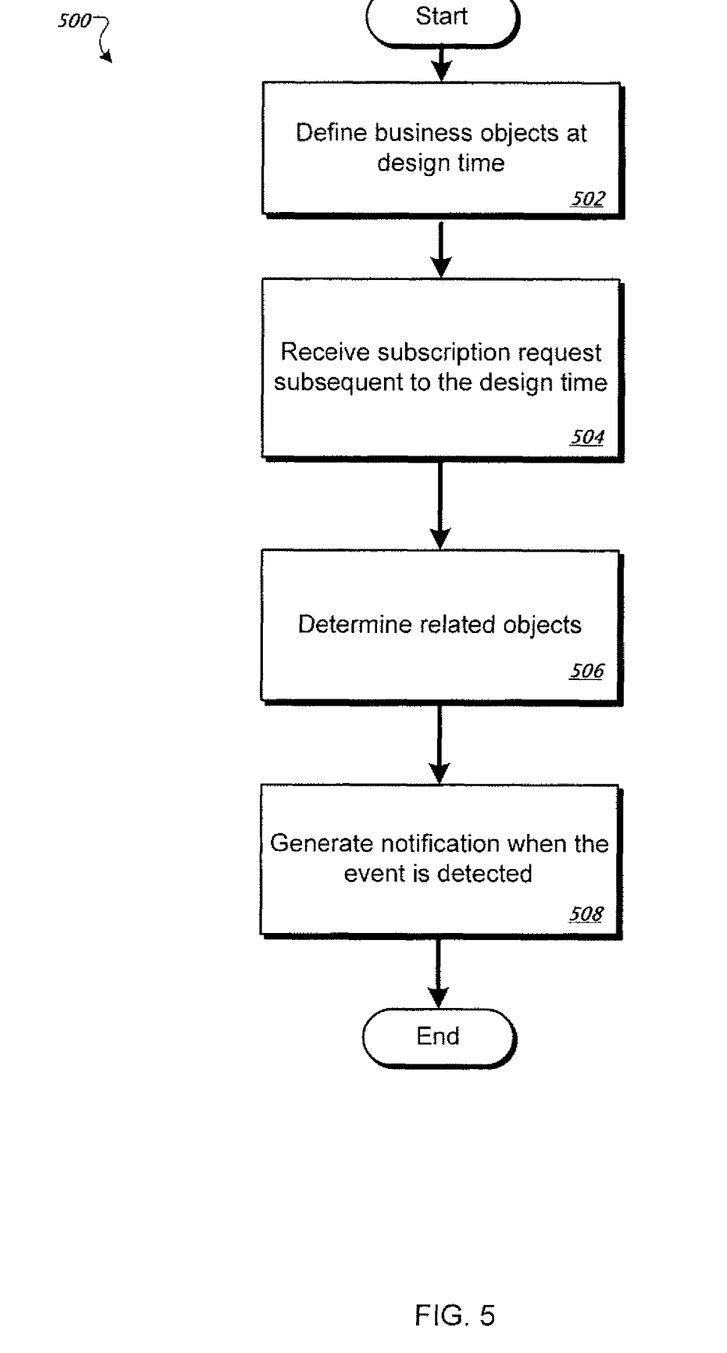
FIG. 5 is a method for associating business objects in a database of an enterprise system with events.

Data objects can be business objects which exist in a business application platform. FIG. 5 is a method 500 for associating such business objects in a database of an enterprise system with events.

In step 502, business objects are defined at design time, the business objects being characterizable by type. For example, a business object of a sales order type can be defined, such as the sales order object 206, and a business object of an invoice type can be defined, such as the invoice object 204.

In step 504, a request is received subsequent to the design time for one of the business objects to subscribe to an event to define a subscriber object, the subscriber object being of a first type. For example, the invoice object 204 can subscribe to an event.

In step 506, the business objects which are related to the event are determined to define publisher objects, the publisher objects being of a second type. For example, it can be determined that the sales order object 206 is related to an event subscribed to by the invoice object 204. The sales order object 206 can be defined as a publisher object.

In step 508, a notification message is generated when the event is detected. For example, the sales order object 206 can generate a notification message when its quantity becomes greater than a defined threshold.

Figure 6:
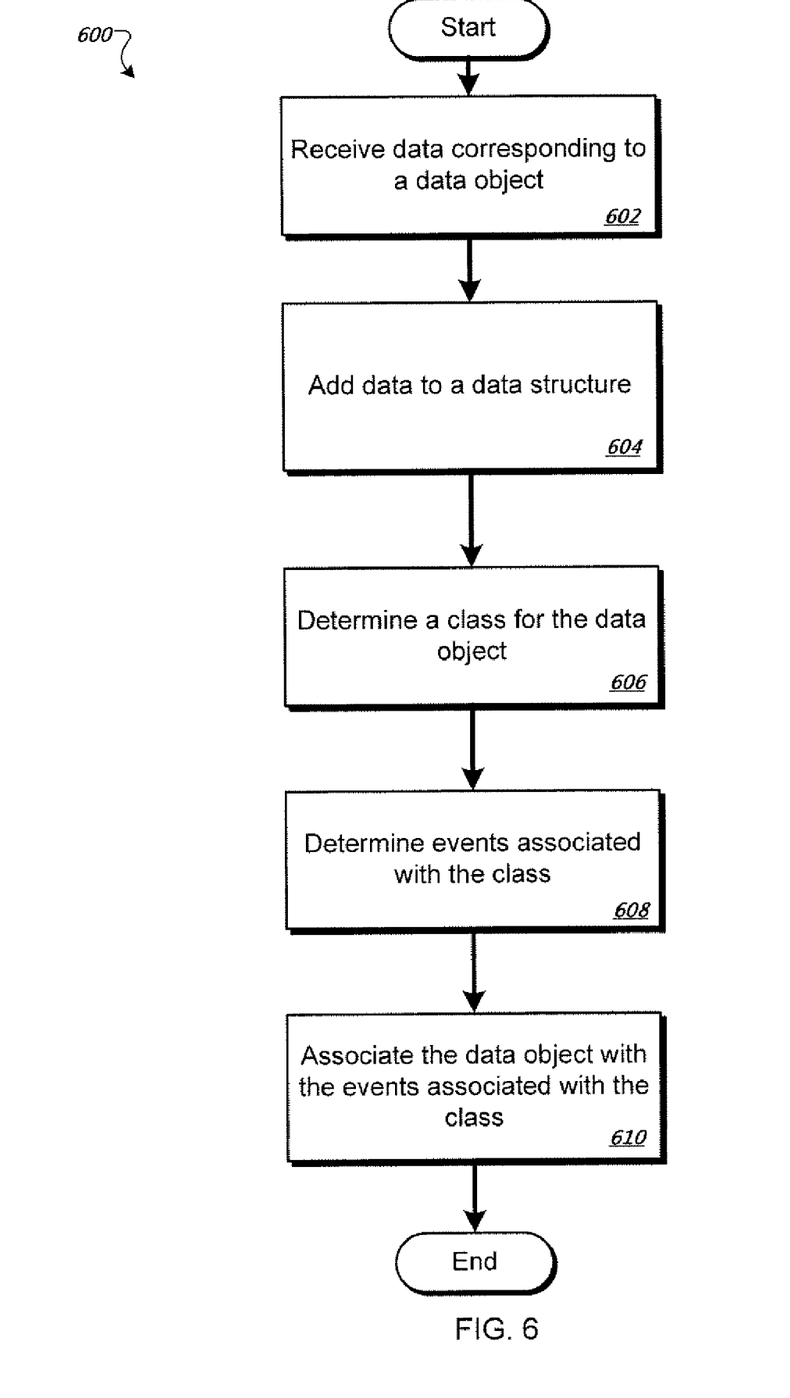
FIG. 6 is a method for adding data corresponding to a data object to a data structure.

FIG. 6 is a method 600 for adding data corresponding to a data object to a data structure. In step 602, data corresponding to a data object is received. For example, the event controller 114 can receive a message corresponding to the data object 204.

In step 604, data is added to a data structure containing multiple previously defined data objects and multiple events associated with the previously defined data objects. For example, the data for a subscription request can be added to the subscription list 208 that is maintained by the event controller 114. The subscription list can include data for multiple data objects, and for each data object, a list of event types can be included.

In step 606, a class for the data object is determined. For example, it can be determined that the data object is an instance of an invoice class.

In step 608, the events which are associated with the class are determined. For example, the events associated with an invoice class can be determined.

In step 610, the data object is associated with the events associated with the class.

Figure 7:
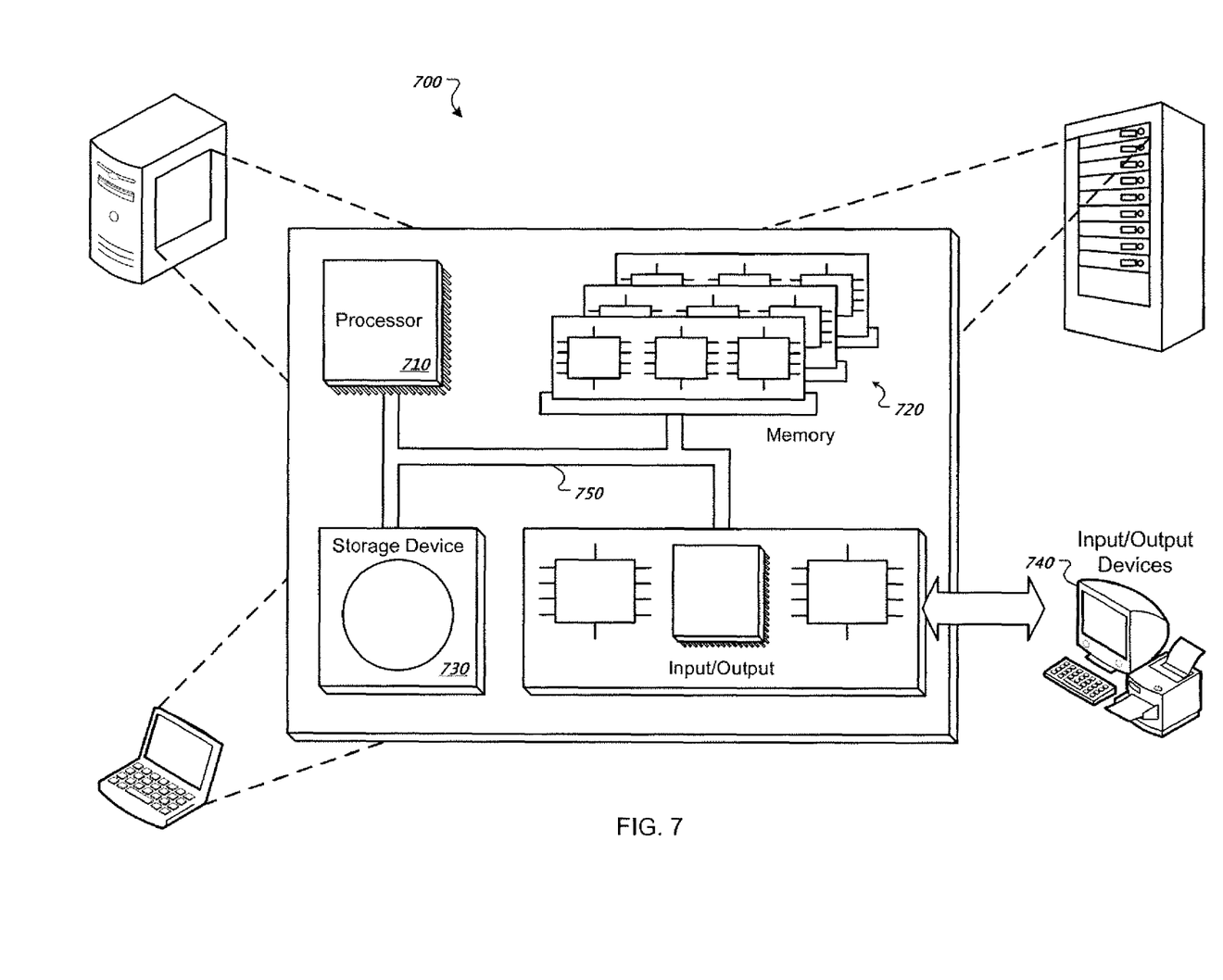
FIG. 7 is a schematic diagram of an example of a generic computer system.

FIG. 7 is a schematic diagram of an example of a generic computer system 700. System 700 may include information systems 100, 200 discussed herein. The system 700 can be used for the operations described in association with the methods 500 and 600, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made. Accordingly, other implementations or variations are within the scope of the following claims.

What is claimed is:

1. A computer-implemented information system comprising:
   a database provided in a computer-readable storage device, data objects stored in the database, the data objects each having at least one design time characteristic associated therewith and further having at least one of a subscriber role and a publisher role, with each data object interacting with one or more applications through an application program interface (API);

an event controller for associating customized data object events with at least some of the data objects subsequent to the design time, the event controller:
receiving a first subscription request from a first data object of the data objects, where the first subscription request is based on a first customized data object event and comprises a first event category field and a first event type defined subsequent to the design time;
identifying a second data object as having the publisher role based on the first event category field;
transmitting a message to the second data object, the message instructing the second data object to transmit a first event to the first data object, the first event corresponding to the first event type;
maintaining a list of subscriptions related to the data objects, the subscription list maintained by the event controller subsequent to the design time; and
a message broker adapted to receive and transmit subscription requests subsequent to the design time and to communicate with the database.

2. The system of claim 1, wherein the event controller comprises a program module separable from the message broker, whereby the event controller may function with different message brokers without modification thereto.

3. The system of claim 1, wherein the system interacts with a business application having an application programming interface adapted to receive the subscription requests, wherein the data objects include business objects.

4. The system of claim 1, further comprising:
receiving a second subscription request from a third data object of the data objects, the second subscription request comprising a second event category field and a second event type;
identifying the first data object as having the publisher role based on the second event category field; and
transmitting an additional message to the first data object, the additional message instructing the first data object to transmit a second event to the third data object, the second event correspond to the second event type.

5. A computer-implemented information system comprising:
data objects stored in a database, the data objects having at least some characteristics defined at a design time and further having at least one of a subscriber role and a publisher role, with each data object interacting with one or more applications through an application program interface (API);
means for associating customized data object events with at least some of the data objects subsequent to the design time;
means for communicating a first control event from a first data object based on the customized data object events, the first control event comprising a first event category field and a first event type defined subsequent to the design time;
means for identifying a second data object as having a publisher role based on the first event category field;
means for transmitting a message to the second data object, the message instructing the second data object to transmit a first event to the first data object, the first event corresponding to the first event type;
means for adding new data objects to the system; and
means for communicating already existing, customized data object events to the new data objects, the new data objects having a publisher role based on receiving the customized data object events.

6. The system of claim 5, further including means associated with the second data object for receiving the first control event and means associated with the second data object for determining at least one predicate associated with the first control event.

7. The system of claim 6, further including means for evaluating when the predicate is true and means for publishing a notification message when the predicate is true.

8. The system of claim 7, further including means for determining an absence of data objects subscribing to the first event corresponding to the notification message and, in the event of said determination, not publishing the notification message.

9. The system of claim 6, further comprising a messaging manager for the data objects, the message manager having means for maintaining a subscription list including data corresponding to event types, customized data object events, and a reference count, the messaging manager having means for altering the value of the reference count for a given one of the data object events in response to a change in the number of data objects having the subscriber role associated with the given data object event.

10. The system of claim 5, wherein the means for associating customized data objects includes means for generating an event condition string and wherein the data objects having the publisher role include means for parsing the string.

11. The system of claim 5, further including means for unsubscribing data objects having the subscriber role from previously associated ones of the customized data object events.

12. The system of claim 5, wherein the means for associating customized data object events includes means for associating the data objects having the subscriber role with corresponding classes of the data objects.

13. The system of claim 5, wherein the system includes a business application platform, wherein the data objects comprise business objects, and wherein the events comprise business events.

14. The system of claim 5, further including means for associating predefined data object events with the data objects at the design time, and wherein the customized data object events are at least partly defined with reference to the predefined data object events.

15. The system of claim 5, further comprising:
means for receiving a second subscription request from a third data object of the data objects, the second subscription request comprising a second event category field and a second event type;
means for identifying the first data object as having the publisher role based on the second event category field; and
means for transmitting an additional message to the first data object, the additional message instructing the first data object to transmit a second event to the third data object, the second event correspond to the second event type.

16. A computer-implemented method of associating business objects in a database of an enterprise system application with events, the method comprising:
defining business objects at a design time, the business objects having at least one of a subscriber role and a publisher role, with each business object interacting with one or more applications through an application program interface (API);
storing the business objects in the database, the database provided in a computer-readable storage device;

receiving a first request subsequent to the design time from a first business object, where the first request is based on a first customized data object event and comprises a first event category field and a first event type defined subsequent to the design time;

determining a second business object as having the publisher role based on the first event category field; and generating a notification message when the first event is detected, the notification message being transmitted to the second business object, the notification message instructing the second business object to transmit the first event to the first business object, the first event corresponding to the first event type.

17. The computer-implemented method of claim 16, further comprising:

receiving a second subscription request from a third data object of the data objects, the second subscription request comprising a second event category field and a second event type;

identifying the first data object as having the publisher role based on the second event category field; and transmitting an additional message to the first data object, the additional message instructing the first data object to transmit a second event to the third data object, the second event correspond to the second event type.

18. A computer program product tangibly embodied in a machine-readable storage device, the computer program product including instructions that, when executed, cause a processor to perform operations comprising:

storing data objects in a database provided in the machine-readable storage device, the data objects having at least one design time characteristic associated therewith and further having at least one of a subscriber role and a publisher role, with each data object interacting with one or more applications through an application program interface (API);

associating customized data object events with at least some of the data objects subsequent to the design time;

receiving a first subscription request from a first data object of the data objects, where the first subscription request is based on a first customized data object event and comprises a first event category field and a first event type;

identifying a second data object as having a publisher role based on the first event category field;

transmitting a message to the second data object, the message instructing the second data object to transmit a first event to the first data object, the first event corresponding to the first event type; and maintaining a list of subscriptions related to the data objects, the subscription list maintained by the event controller subsequent to the design time.

19. The computer program product of claim 18, wherein a business application having an application programming interface is adapted to receive the subscription requests, the data objects include business objects processed by the business application.

20. The computer program product of claim 18, further comprising:

receiving a second subscription request from a third data object of the data objects, the second subscription request comprising a second event category field and a second event type;

identifying the first data object as having the publisher role based on the second event category field; and transmitting an additional message to the first data object, the additional message instructing the first data object to transmit a second event to the third data object, the second event correspond to the second event type.

\* \* \* \* \*